Oct. 30, 1951 W. G. WILSON 2,573,636
CORD REEL OR HOLDER
Filed March 19, 1947
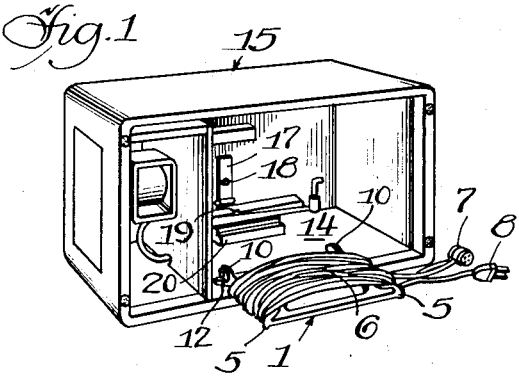
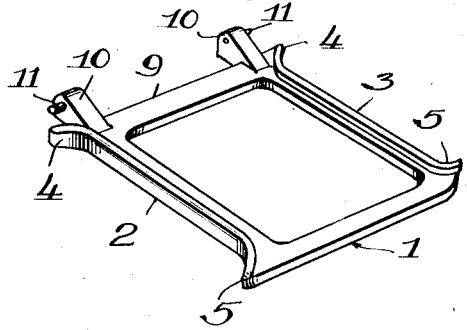
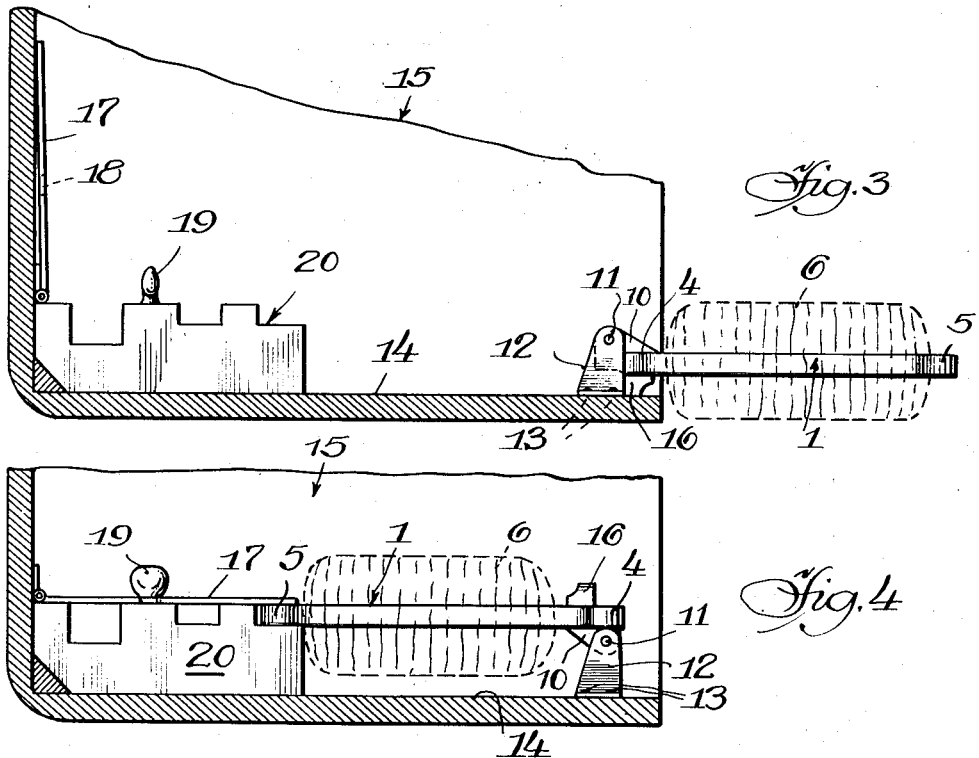
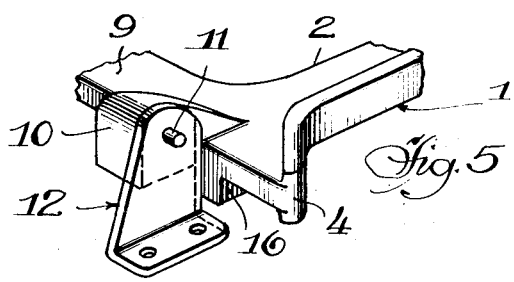
INVENTOR.
William G. Wilson
BY
Carl F. Geppert
Atty.

Patented Oct. 30, 1951

2,573,636

UNITED STATES PATENT OFFICE 2,573,636

CORD REEL OR HOLDER

William G. Wilson, Merriam, Kans., assignor to Movie-Mite Corporation, Kansas City, Mo., a corporation of Missouri Application March 19, 1947, Serial No. 735,695

3 Claims. (Cl. 242—85)

The present invention relates to a reel or holder and especially to a novel hinged member upon which the operator winds the flexible wires, cords or electrical conductors that are a part of the equipment of a sound-on-film projector.

In the construction and operation of sound motion picture projectors and especially to 16 mm. sound-on-film projectors, it is necessary to carry a considerable amount or length of flexible wire or cord for connecting not only the projector to an outlet for a source of electrical supply but to also connect the loud speaker to the projector. In such machines, the loud speaker is generally located adjacent the screen and is normally placed at some distance from the projector.

In the reassembly or replacement of the equipment in a self-contained projector unit after use, it is very inconvenient and awkward to reach inside the cover or top of the projector or speaker case to wind up and locate this cord for transportation. Likewise, considerable difficulty is had in properly locating the long lengths of wire or cord to be replaced and the latter may be readily twisted or damaged.

It is an object of the present invention to provide a most convenient and accessible mounting for the relatively long lengths of wire or cord and which greatly facilitates not only the replacement of these wires or cords for subsequent reuse, but which also facilitates setting up of the projector for operation.

The invention further comprehends a novel rack pivotally or hingedly mounted in the top or cover of the projector or other convenient and accessible location so as to make available the relatively long lengths of wire or cord for forming all of the necessary electrical connections for successful operation of a sound-on-film projector. Being pivotally mounted, the rack may be quickly folded into the top or cover when the projector is assembled for non-use, and folded out for most convenient access to the wires or cord when the machine is to be made ready for operation.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the top or cover for a sound-on-film or sound motion picture projector and the novel invention of cord reel or rack applied thereto.

Fig. 2 is a view in perspective of the cord reel or rack disassembled from the cover or support on which it is pivotally or hingedly mounted.

Fig. 3 is a fragmentary enlarged view in vertical cross-section taken through the cover for the projector and showing the reel or rack in open or extended position.

Fig. 4 is a view similar to Fig. 3 but showing the reel or rack folded back into the case and locked thereat when the wires or cord are not in use.

Fig. 5 is a fragmentary perspective view showing the manner of pivotally or hingedly mounting the reel or rack to its support.

Referring more particularly to the illustrative embodiment shown in the drawing, the novel reel or rack 1 is shown as a substantially rectangular shaped frame but with the opposite sides 2 and 3 thereof having their external edges so contoured as to provide at each end outwardly curved projections 4 and 5 for confining therebetween the lengths of wire or cord 6 wound thereon and retaining such wires against lateral displacement. As shown in Fig. 1, the wires or cord for making all necessary connections to the projector and loud speaker and to an outlet or source of electrical energy are provided with the necessary connectors or plugs 7 and 8.

To permit most convenient access to the reel or rack, the base 9 thereof is provided adjacent each end with a projecting lug 10 and with each lug having a laterally extending pin or projection 11 adapted to be received in an opening formed or provided in a spaced upstanding bracket 12 secured by screws or other suitable means 13 to a side wall 14 of the top or cover 15 for a projector. Spaced depending legs 16 project from the base 9 to support the reel or rack when in operative or extended position as shown in Figs. 1 and 3. When the reel or rack is returned to its inturned position as shown in Fig. 4, it is locked in such position by means of a hinged retaining clip or clamp fastener 17 provided with a transverse slot 18 for receiving a wing nut or locking member 19 rotatably mounted upon a supporting block 20, and which wing nut when turned is adapted to retain the clamp fastener and reel or rack in assembled, locked position upon the supporting block.

When the top or cover 15 is removed for operation of the projector, it is placed on its side as in Fig. 1. With the reel or rack in the locked position shown in Fig. 4, turning of the wing nut 19 releases the clamp fastener 17 and raising or upending this fastener to the position shown in Fig. 3 permits the reel or rack 1 and the wires or cord 6 wound thereabout to be folded out to the open position shown in Fig. 1. It is then a simple matter to unwind the cord and to connect the plug 7 to the projector and the plug 8 to an outlet for a source of current supply.

When the operation has been completed and the plugs 7 and 8 are removed, and with the reel or rack 1 swung to the position outside the cover or projector case as in Figs. 1 and 3, it is in a convenient position upon which to wind the relatively long lengths of cord. When that has been accomplished, the rack may be folded or swung back into the case and fastened or locked in position by the retaining clip or clamp fastener 17 and the wing nut 19.

From the above description and the disclosure in the drawing, it will be appreciated that the present invention comprehends a novel means and manner of conveniently receiving and retaining the long lengths of flexible wire or cord required for conducting electric current from a source of electrical supply to a projector and loud speaker of a sound-on-film projection apparatus. The novel reel or rack and its pivotal mounting in the cover or projector case facilitates assembly or replacement of the cord after use for storage or transportation, and also greatly facilitates removal of the cord when the projector is removed from the cover or case for operation.

Having thus disclosed my invention, I claim:

1. In a portable sound motion picture projector apparatus comprising a cover for a sound-on-film picture projector provided with compartments, top, bottom and side walls and an open side; the combination with said cover of a pair of spaced brackets having straight sides forming faces, said brackets being mounted on one of said walls adjacent said open side, a supporting block having a forward stepped portion, said block being mounted on said last named wall but being spaced from said brackets, a substantially rectangular frame forming a reel and having projecting corners, and integral spaced legs extending from the plane of said frame, said legs having straight faces adapted to engage the faces of said brackets when the frame has been swung to its extended position for positioning said frame in a plane parallel to the plane of said last named wall, a pair of projections each located adjacent to a projecting corner of said frame for pivotally mounting said frame on said brackets, said forward stepped portion of said block forming a support for the opposite end of the frame from said legs whereby said frame may be swung from its extended position to its folded position with the said frame opposite end resting on the stepped portion of said block and said frame being in spaced parallel relationship with the said last named wall.

2. In a portable sound motion picture projector apparatus comprising a cover for a sound-on-film picture projector provided with compartments, top, bottom and side walls and an open side; the combination with said cover of a pair of spaced brackets having straight sides forming faces, said brackets being mounted on one of said walls adjacent said open side, a supporting block having a foward stepped portion, said block being mounted on said last named wall but being spaced from said brackets, a substantially rectangular frame forming a reel and having projecting corners, and integral spaced legs extending from the plane of said frame, said legs having straight faces adapted to engage the faces of said brackets when the frame has been swung to its extended position for positioning said frame in a plane parallel to the plane of said last named wall, a pair of projections each located adjacent to a projecting corner of said frame for pivotally mounting said frame on said brackets, said forward stepped portion of said block forming a support for the opposite end of the frame from said legs whereby said frame may be swung from its extended position to its folded position with the said frame opposite end resting on the stepped portion of said block and said frame being in spaced parallel relationship with the said last named wall, and a pivoted clamp fastener swingable from a position away from said block stepped portion to a position overlying said stepped portion whereby to retain said frame opposite end therein, and means for locking said clamp fastener to said block.

3. In a portable sound motion picture projector apparatus comprising a cover for a sound-on-film projector provided with compartments, top, bottom and side walls and an open side; the combination with said cover of a pair of spaced brackets having straight sides forming faces, said brackets being mounted on one of said walls adjacent said open side, a supporting block having a forward stepped portion, said block being mounted on said last named wall but being spaced from said brackets, a substantially rectangular frame forming a reel and having projecting corners, and integral spaced legs extending from the plane of said frame, said legs having straight faces adapted to engage the faces of said brackets when the frame has been swung to its extended position for positioning said frame in a plane parallel to the plane of said last named wall, a pair of projections each located adjacent to a projecting corner of said frame for pivotally mounting said frame on said brackets, said forward stepped portion of said block forming a support for the opposite end of the frame from said legs whereby said frame may be swung from its extended position to its folded position with the said frame opposite end resting on the stepped portion of said block and said frame being in spaced parallel relationship with the said last named wall, and a pivoted swingable clamp fastener swingable from a position away from the said stepped portion to a position overlying said stepped portion, said clamp fastener having a slot therein and said block having a locking member pivoted thereon and adapted to extend thru said slot whereby to retain said frame opposite end on said stepped portion by said clamp fastener locking member when said frame is in its folded position.

WILLIAM G. WILSON.

REFERENCES CITED

The following references are of record in the file of this patent:

UNITED STATES PATENTS

| Number | Name | Date |
|---|---|---|
| 1,018,550 | Brearey | Feb. 27, 1912 |
| 1,878,537 | Phister et al. | Sept. 20, 1932 |
| 2,042,947 | Lewis | June 2, 1936 |
| 2,287,368 | Anderson | June 23, 1942 |
| 2,319,111 | Calvin et al. | May 11, 1943 |